(12) United States Patent
Juven et al.

(10) Patent No.: US 12,425,992 B2
(45) Date of Patent: Sep. 23, 2025

(54) DECENTRALIZED SYNCHRONIZATION SOLUTION FOR WIRELESS COMMUNICATION NETWORKS

(71) Applicant: WIREPAS OY, Tampere (FI)

(72) Inventors: Ville Juven, Tampere (FI); Ville Kaseva, Tampere (FI); Juha Salokannel, Tampere (FI)

(73) Assignee: WIREPAS OY, Tampere (FI)

( * ) Notice: Subject to any disclaimer, the term of this patent is extended or adjusted under 35 U.S.C. 154(b) by 355 days.

(21) Appl. No.: 17/761,629

(22) PCT Filed: Aug. 26, 2020

(86) PCT No.: PCT/FI2020/050554
§ 371 (c)(1),
(2) Date: Mar. 18, 2022

(87) PCT Pub. No.: WO2021/053263
PCT Pub. Date: Mar. 25, 2021

(65) Prior Publication Data
US 2022/0377685 A1    Nov. 24, 2022

(30) Foreign Application Priority Data
Sep. 18, 2019   (FI) ..................................... 20195779

(51) Int. Cl.
*H04W 56/00*    (2009.01)
*H04W 4/80*    (2018.01)

(52) U.S. Cl.
CPC ........... *H04W 56/001* (2013.01); *H04W 4/80* (2018.02); *H04W 56/003* (2013.01)

(58) Field of Classification Search
CPC ... H04W 56/001; H04W 4/80; H04W 56/003; H04W 72/121; H04W 48/18; H04W 84/18; H04W 72/54; Y02D 30/70; H04B 1/7156
See application file for complete search history.

(56) References Cited

U.S. PATENT DOCUMENTS 9,374,831 B2   6/2016   Ho
9,516,615 B2   12/2016  Stacey
(Continued)

FOREIGN PATENT DOCUMENTS

JP   2007521764 A   8/2007
JP   2019506813 A   3/2019
(Continued)

OTHER PUBLICATIONS

International Search Report and Written Opinion mailed Nov. 2, 2020, from International Application No. PCT/FI2020/050554, 16 pages.
(Continued)

*Primary Examiner* — Brandon M Renner
(74) *Attorney, Agent, or Firm* — Meunier Carlin & Curfman LLC (57) ABSTRACT

The invention relates to a wireless communication system comprising a plurality of radio devices. Each radio device of the plurality of radio devices is configured to: obtain timing information representing timing schedules of one or more other radio devices within its neighborhood; define, based on the obtained timing information, at least one timing schedule group into which the plurality of radio devices are divided and a size of each at least one timing schedule group; and synchronize its own timing schedule with the timing schedule of the timing schedule group with the largest size. The invention relates also to a synchronization method (500) for the wireless communication system, a
(Continued)

radio device for a wireless communication system, and a synchronization method for the radio device.

15 Claims, 7 Drawing Sheets

(56) References Cited

U.S. PATENT DOCUMENTS

| | | | |
|---|---|---|---|
| 9,843,995 | B2 | 12/2017 | Abraham et al. |
| 11,082,808 | B1* | 8/2021 | Shukla ................. H04W 72/30 |
| 2005/0079883 | A1 | 4/2005 | Khawand et al. |
| 2009/0028090 | A1 | 1/2009 | Sim et al. |
| 2015/0043541 | A1* | 2/2015 | Blankenship ..... H04W 72/0446 |
| | | | 370/336 |
| 2016/0212740 | A1* | 7/2016 | Hui .......................... H04L 43/16 |
| 2017/0150296 | A1 | 5/2017 | Jung |
| 2017/0244576 | A1 | 8/2017 | Batra et al. |
| 2017/0347366 | A1* | 11/2017 | Ling ................. H04W 72/1215 |
| 2018/0007575 | A1* | 1/2018 | Singhal ................. H04W 76/15 |
| 2018/0032376 | A1* | 2/2018 | Udava ................... G06F 9/4881 |
| 2019/0312726 | A1* | 10/2019 | Sierra ................... H04L 63/104 |
| 2020/0059827 | A1* | 2/2020 | Arvidson ................ H04L 47/32 |
| 2020/0106691 | A1* | 4/2020 | Koshelev ............ G06F 11/3006 |
| 2021/0399815 | A1* | 12/2021 | Zhu ....................... H04W 52/46 |

FOREIGN PATENT DOCUMENTS

| | | |
|---|---|---|
| WO | 2008027294 A2 | 3/2008 |
| WO | 2016153279 A1 | 9/2016 |

OTHER PUBLICATIONS

Finnish Search Report dated Mar. 11, 2020, from FI Application No. 20195779, 2 pages.

Liu, Bing et al., "An Energy-Efficient Medium Access Control for Wireless Sensor Networks", IEEEVTS Vehicular Technology Conference. Proceedings, IEEE, Apr. 1, 2007, pp. 208-211.

Ammar, Ibrahim et al., "Overlapped Schedules with Centralized Clustering for Wireless Sensor Networks", 2014 IEEE 28th International Conference on Advanced Information Networking and Applications, IEEE, Mar. 25, 2013, pp. 33-40.

Guerroumi, Mohamed et al., "Hybrid data dissemination protocol (HDDP) for wireless sensor networks", Wireless Network, vol. 24, No. 5, Dec. 26, 2016, pp. 1739-1754.

Office Action issued in corresponding JP App. No. 2022-516617, mailed May 14, 2024, 10 pages.

* cited by examiner

DECENTRALIZED SYNCHRONIZATION SOLUTION FOR WIRELESS COMMUNICATION NETWORKS

CROSS REFERENCE TO RELATED APPLICATIONS

This application is a United States National Phase Patent Application of International Patent Application Number PCT/FI2020/050554, filed on Aug. 26, 2020, which claims the benefit of priority to Finnish National Patent Application number FI 20195779, filed on Sep. 18, 2019, both of which are incorporated by reference herein in their entireties.

TECHNICAL FIELD

The invention concerns in general the technical field of wireless communication networks. Especially the invention concerns time synchronization of wireless communication networks.

BACKGROUND

The usage of low power consuming radio technologies is becoming more common in various applications, for example in sensor networks and asset management. Especially a rise of Internet of Things (IoT) increases the usage of the low power consuming radio technologies. The sensors, assets and other types of devices with radio interfaces, later referred as "radio devices", have typically a limited energy resource, like a coin cell battery. Also, spectral resources they use are limited as the number of devices and different communication systems sharing the same frequency bands may be high. However, the radio devices usually need to communicate with each other and/or with a backbone network (e.g. Internet) regularly to serve the intended usage.

A commonly used mechanism to save energy and avoid transmission collisions in wireless communication systems is to define a timing schedule for energy-consuming activities of a radio circuitry the radio device, maximizing the time the radio devices may stay in most power-efficient states, like in a sleep state. For example, in a radio communication between two radio devices (point-to-point topology) one of the radio devices may be equipped with a sensor module and configured to wake up from the sleep state once in minute to report a new sensor value. As long as the sensor-equipped radio device does the reporting accurately, the other radio device may be configured to wake up from the sleep state to receive the reports effectively at the right times. The same logic may typically be extended for a star (point-to-multipoint) topology. For example, a central radio device in a star topology broadcasts a beacon message using a regular interval. A plurality of other radio devices that are configured to receive the beacon messages broadcasted by the central radio device know or learn to know timing of the beacon messages. Therefore, the plurality of other radio devices does not need to keep their receiver on continuously to receive the beacon message, but only during the time window the beacon messages are transmitted by the central radio device. However, in practice the receiving time window has to be slightly extended due to slight drifting of the clocks of the radio devices. The timing of the beacon messages, i.e. the timing defined by the central radio device, may also typically be used as a reference time for a synchronization of all transmission and receiving activities among the radio devices participating the star topology.

A usage of Frequency Hopping Spread Spectrum (FHSS) method may be a challenge in wireless decentralized multi-hop networks, because the radio devices need not only to synchronize in time, but also frequency changes of the radio devices need to be synchronized so that transmission collisions may be avoided.

One option to achieve synchronization in a multi-hop, e.g. two-hop, network is to use network-wide notion of time, which may be defined by a central controller. However, if the central controller drops from the network, the whole network loses the synchronization. Similarly, if a group of devices is separated from the main network, they may not be able to maintain synchronization with each other as the central controller is not anymore part of their portion of the network.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present, a wireless communication system, a synchronization method for the wireless communication system, a radio device for a wireless communication system, a synchronization method for the radio device, a computer program, and a tangible non-volatile computer readable medium. Another objective of the invention is that the wireless communication system, the methods, the radio device, the computer program, and the tangible non-volatile computer readable medium enables synchronization of the wireless communication system without central coordination and network-wide information.

The objectives of the invention are reached by a wireless communication system, a synchronization method for the wireless communication system, a radio device for a wireless communication system, a synchronization method for the radio device, a computer program, and a tangible non-volatile computer readable medium as defined by the respective independent claims.

According to a first aspect, a wireless communication system comprising a plurality of radio devices is provided, wherein each radio device of the plurality of radio devices is configured to: obtain timing information representing timing schedules of one or more other radio devices within its neighborhood; define, based on the obtained timing information, at least one timing schedule group into which the plurality of radio devices are divided and a size of each at least one timing schedule group; and synchronize its own timing schedule with the timing schedule of the timing schedule group with the largest size.

If two or more timing schedule groups with the largest size have an equal size, said each radio device may be configured to: compare its own timing schedule to the timing schedules of the two or more timing schedule groups with the largest size; and synchronize its own timing schedule with the timing schedule of the timing schedule group to which it belongs, if the radio device detects that it belongs to one of the largest timing schedule groups; or select one of the timing schedule groups with the largest size based on a selection criterion and synchronize its own timing schedule with the timing schedule of the selected one from the timing schedule groups with the largest size.

The selection criterion may be random-based selection, evaluation order-based, or highest Received Signal Strength Indication, RSSI-based selection or a combination of two or more of such criteria.

The timing information may be obtained from one or more radio transmissions from one or more other radio devices within the neighborhood, wherein each radio transmission may comprise timing information representing the timing schedule of the other radio device itself and/or timing information representing the timing schedule of one or more neighbors of the other radio devices.

The timing information may comprise time slot boundaries of the timing schedules of the one or more other radio devices within the neighborhood.

The definition of the at least one timing schedule group may comprise: normalizing the obtained time slot boundaries by using a common time slot length of the wireless communication system, defining time slot difference values between the normalized time slot boundaries of the one or more other radio devices within the neighborhood, and comparing the defined time slot difference values to a timing difference limit value.

Alternatively or in addition, the timing information may comprise a time-frequency slot offset value of the timing schedules of the one or more other radio devices within the neighborhood.

The definition of the at least one timing schedule group may comprise comparison between the obtained time-frequency slot offset values of the one or more other radio devices within the neighborhood.

The wireless communication system may be based on Bluetooth Low Energy, BLE, advertising protocol.

Furthermore, the timing information may be obtained from one or more BLE advertising packets comprising timing information on one or more advertising channels and transmitted by the one or more other radio devices within the neighborhood, wherein each radio device may be configured to synchronize its own BLE advertising timing schedule with the BLE advertising timing schedule group with the largest size.

Alternatively, the timing information may be obtained from: one or more BLE advertising packets comprising timing information on one or more data channels and transmitted by the one or more other radio devices within the neighborhood, or one or more BLE data channel transmissions from one or more other radio devices within the neighborhood, wherein each radio device may be configured to synchronize its own timing schedule of the BLE data channel transmissions with the timing schedule of the BLE data channel transmissions of the timing schedule group with the largest size.

According to a second aspect, a synchronization method for the wireless communication system described above is provided, the method comprises: obtaining, by each radio device of the system, timing information representing timing schedules of one or more other radio devices within its neighborhood; defining, by each radio device of the system, based on the obtained timing information, at least one timing schedule group into which the plurality of radio devices are divided and a size of each at least one timing schedule group; and synchronizing, by each radio device of the system, its own timing schedule with the timing schedule of the timing schedule group with the largest size.

According to a third aspect, a radio device for a wireless communication system is provided, wherein the radio device comprises: a processing part, and a data transfer part for providing a bi-directional radio communication with at least one other radio device of the system, which radio device is configured to: obtain, by the data transfer part, timing information representing timing schedules of one or more other radio devices within its neighborhood; define, by the processing part, based on the obtained timing information, at least one timing schedule group into which the plurality of radio devices are divided and a size of each at least one timing schedule group; and synchronize, by the processing part, its own timing schedule with the timing schedule of the timing schedule group with the largest size.

According to a fourth aspect, a synchronization method for the radio device described above within a wireless communication system is provided, wherein the method comprises: obtaining, by the data transfer part, timing information representing timing schedules of one or more other radio devices within its neighborhood; defining, by the processing part, based on the obtained timing information, at least one timing schedule group into which the plurality of radio devices are divided and a size of each at least one timing schedule group; and synchronizing, by the processing part its own timing schedule with the timing schedule of the timing schedule group with the largest size.

According to a fifth aspect, a computer program is provided, wherein the computer program comprises instructions which, when the program is executed by the radio device described above, cause the radio device to carry out at least the steps of the synchronization method described above.

According to a sixth aspect, a tangible non-volatile computer readable medium comprising the computer program described above is provided.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1:
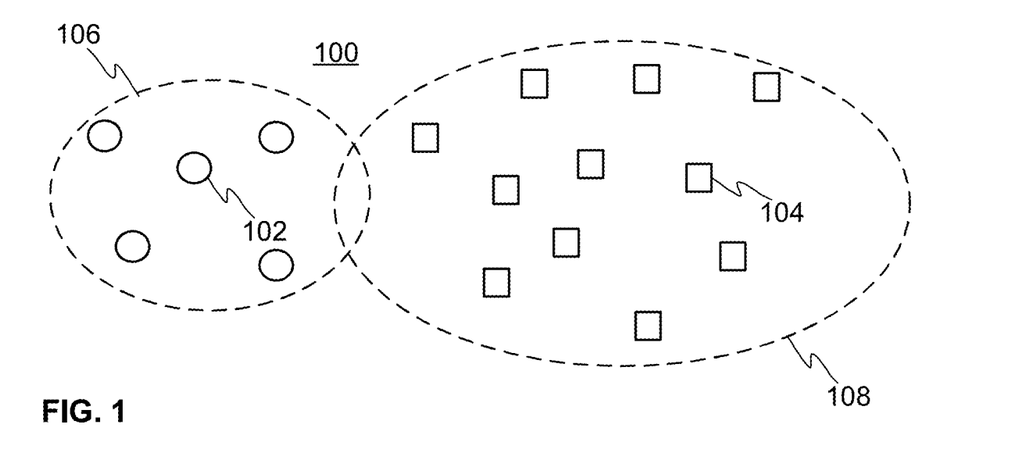
FIG. 1 illustrates schematically an example topology of a wireless communication system according to the invention.

FIG. 1 illustrates an example topology of a wireless communication system 100 according to the invention. The wireless communication system 100 may be a wireless mesh communication network, such as a wireless sensor network (WSN) or a wireless user (end) device network. The wireless communication in the system 100 may be based on e.g. Bluetooth Low Energy (BLE), IEEE 802.15 standard, IEEE 802.11 standard, or other radio protocol. The wireless communication system 100 comprises a plurality of radio devices 102, 104. The plurality of radio devices 102, 104 of the wireless communication system 100 may be divided into at least one timing schedule group 106, 108 based on timing schedules of the plurality of radio devices 102, 104. Each timing schedule group 106, 108 comprises a plurality of radio devices having the same timing schedule, i.e. the timing schedules of the plurality of radio devices belonging to the same timing schedule group have synchronized timing schedules with each other. In the example topology of FIG. 1 the system 100 comprises two timing schedule groups 106, 108. A plurality of radio devices 102 (illustrated with circles) belongs to a first timing schedule group 106 and a plurality of radio devices 104 (illustrated with squares) belongs to a second timing schedule group 108. The first timing schedule group 106 comprises five radio devices 102 and the second timing schedule group 108 comprises eleven radio devices 104 in this example topology. The wireless communication system 100 according to the invention does not comprise a central control device for providing the synchronization of the system 100, i.e. the wireless communication system 100 according to the invention is based on a decentralized synchronization. Furthermore, in the wireless communication system according to the invention enables synchronization without network-wide information, such as network-wide notion of time.

Figure 2:
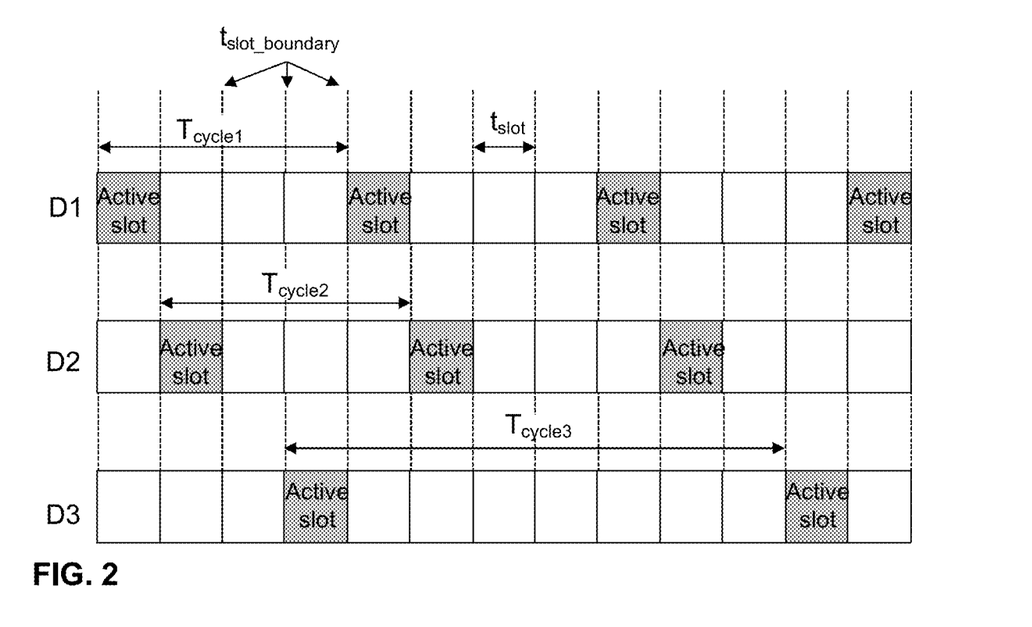
FIG. 2 illustrates simple examples of timing schedules of a plurality of radio devices of a wireless communication system according to the invention.

FIG. 2 illustrates simple examples of timing schedules of three example radio devices D1-D3 of a wireless communication system 100. The timing schedule of each radio device D1-D3 is divided into a plurality of time slots. The term "time slot" throughout this application means a time period of the time schedule. In FIG. 2 the time slots of the timing schedules of each radio device D1-D3 are illustrated as successive rectangles. The length of the time slot $t_{slot}$, i.e. a duration of the time period, may be static within the wireless communication system 100. However, the invention is not limited to the static time slot length. In the example of FIG. 2, the three radio devices D1-D3 have synchronized timing schedules with each other, which means that the system 100 comprises one timing schedule group to which all radio devices of the system 100 belong. When the radio devices have synchronized timing schedules with each other they have a common notion of a time slot boundary $t_{slot\_boundary}$, i.e. a starting time of any of time slots of the timing schedule. Basically, with a common notion of time slot boundary $t_{slot\_boundary}$ the time slots do not overlap and transmission collisions may be avoided efficiently. In practice, the common notion of time slot boundary may need to be checked and corrected regularly because of the clock drift between radio devices. In the example timing schedules of FIG. 2, during an active time slot the radio device D1-D3 has access to transmit. Each radio devices D1-D3 may have different cycle times $T_{cycle}$, i.e. repetition times of their active time slots, as illustrated in the example of FIG. 2. Alternatively, all radio devices D1-D3 of the wireless communication system 100 may have the same cycle times. Each radio device may also have more than one active time slots inside the cycle time $T_{cycle}$. The time slot allocation and signaling are outside of the scope of this invention.

Figure 3A:
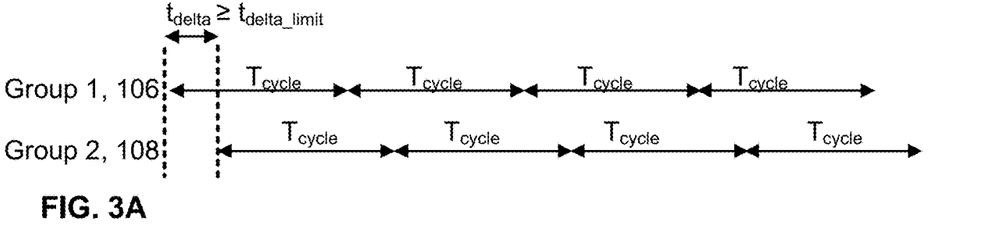
FIG. 3A illustrates schematically a simple example of two timing schedule groups of the wireless communication system in a non-synchronized situation.
Figure 3B:
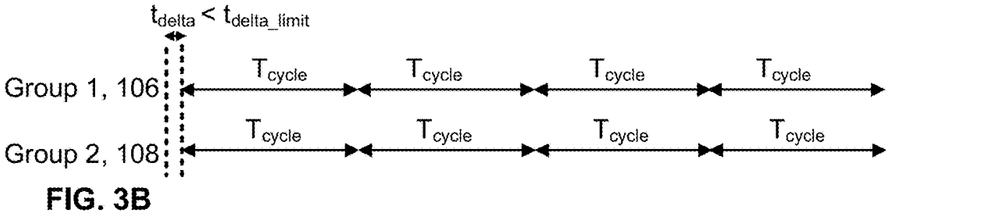
FIG. 3B illustrates schematically a simple example of two timing schedule groups of the wireless communication system in a synchronized situation.

FIG. 3A illustrates schematically a simple example of two timing schedule groups 106, 108 of the wireless communication system 100 according to the invention. In this example the two timing schedule groups 106, 108 are a first timing schedule group 106 and a second timing schedule group 108. Both timing schedule groups 106, 108 have the same cycle time $T_{cycle}$, but the first timing schedule group 106 and the second timing schedule group 108 are non-synchronized. The non-synchronization of the timing schedules between at least two timing schedule groups 106, 108 may be indicated with a slot boundary difference value, i.e. delta value, $t_{delta}$ between the slot boundary of the first timing schedule group 106 and the slot boundary of the second timing schedule group 108. Such slot boundary difference value breaks the synchronization of the system 100, while the aim is to synchronize the timing schedules of the two timing schedule groups 106, 108, i.e. to get the slot boundary difference value below a timing difference limit, i.e. an error margin, $t_{limit}$ as illustrated in FIG. 3B, wherein the slot boundary difference value $t_{delta}$ between the slot boundary of the first timing schedule group 106 and the slot boundary of the second timing schedule group 108 is less than the timing difference limit $t_{limit}$. The timing difference limit allows flexibility for the timing, e.g. due to slightly different clock drifting of each radio device. The timing difference limit may be adjustable.

Figure 4:
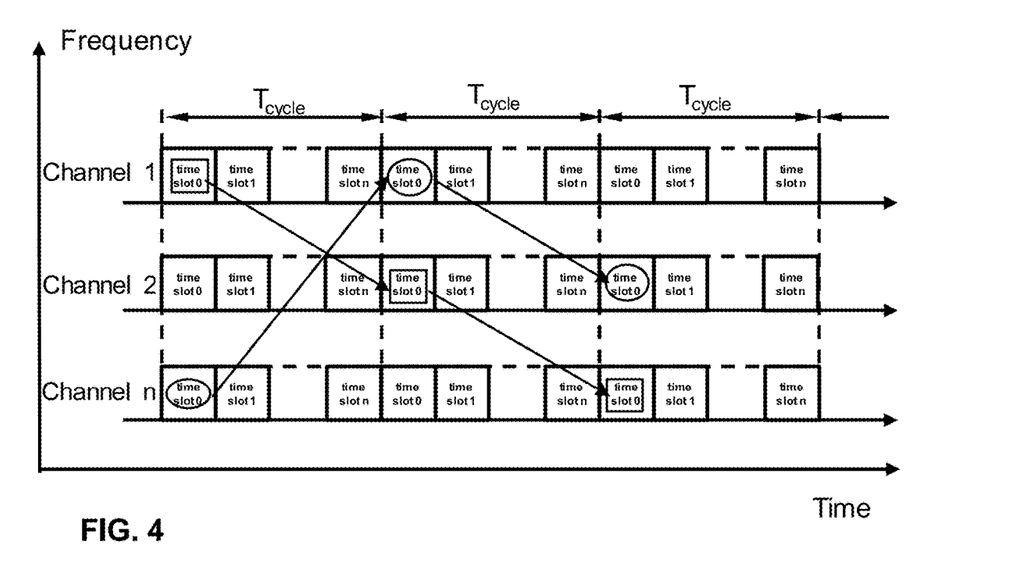
FIG. 4 illustrates schematically an example of a synchronized Frequency-Time Division Multiple Access (FTDMA) arrangement with a Frequency Hopping Spread Spectrum (FHSS) sequence.

The plurality of radio devices 102, 104 of the system 100 may be implemented in a Time Division Multiple Access (TDMA) arrangement, wherein the plurality of radio devices 102, 104 shares a common frequency channel. Alternatively, the plurality of radio devices 102, 104 of the system 100 may be implemented in a Frequency-Time Division Multiple Access (FTDMA) arrangement, wherein the plurality of radio devices shares a plurality of common frequency channels. FIG. 4 illustrates schematically an example of a synchronized FTDMA arrangement. In this example, each frequency channel (Channels 1-n) is divided into time slots (time slots 0-n). The time slots may be lined up over the frequency channels and repeated on regular intervals, i.e. cycles. The invention is not limited to a scope of fixed cycle times, i.e. cycle lengths, but the invention may be applied to variable cycle times as well. The cycle times $T_{cycle}$ and time slot lengths $t_{slot}$ may be common within the system 100. In the example of FIG. 4 the time slots and the cycle times are synchronized over the frequency channels, i.e. all radio devices of the system 100 are intended to use the same timing schedule. It means that the system 100 comprises one timing schedule group to which all radio devices of the system 100 belong.

When using the FTDMA arrangement the plurality of radio devices 102, 104 of the wireless communication system 100 a frequency hopping sequence, e.g. Frequency Hopping Spread Spectrum (FHSS) sequence may be applied, wherein each radio device 102, 104 changes the frequency channel and/or time slot at every cycle in a predefined sequence. In the example FTDMA arrangement of FIG. 4 an example of the FHSS sequence for two radio devices D1 and D2 is illustrated. When the FHSS sequence is applied, the synchronization of timing schedules of the plurality of radio devices 102, 104 of the system 100 may alternatively or additionally comprise synchronization of the FHSS sequence. In other words, in addition or alternatively to synchronizing the time slot boundaries of the plurality of radio devices of the system 100 the FHSS sequence of the plurality of radio devices of the system 100 may be synchronized. In the example wireless network 100 without a central coordination, i.e. with decentralized coordination, the FHSS sequences may need to be defined by each radio device 102, 104 themselves. Even if the frequency channel and/or time slot is changed at every cycle, the radio devices 102, 104 should not end up in collisions. Therefore, the neighboring radio devices 102, 104 of the system 100 need to use the same FHSS sequence and they have to synchronize the FHSS sequences. The FHSS sequence may be defined in various ways. A simple example of FHSS may be an incremental sequence where an index of the frequency channel is increased by one at every hop. For example, if there are four frequency channels available in the FTDMA arrangement, the sequence may be 1, 2, 3, 4, 1, 2, 3, 4, 1, 2, and so on. To achieve and maintain the FHSS sequence synchronization of a decentralized wireless communication system 100 the radio devices of the system 100 have a common notion of a time-frequency slot offset value, i.e. phase value, $idx_{phase}$. The time slots used by the radio device D1 are illustrated with squares and the time slots used by the radio device D2 are illustrated with circles in the example of FIG. 4, wherein the time-frequency slot index $idx_{phase}$ of the radio device D1 and the time-frequency slot index $idx_{phase}$ of the radio device D2 are incremented by one at every cycle.

A decentralized synchronization method according to the invention is described next by referring to one radio device 102, 104. However, each of the plurality of radio devices 102, 104 of the wireless communication system 100 may perform the decentralized synchronization method steps independently. In order to synchronize the whole wireless communication system 100 each of the plurality of radio devices 102, 104 of the wireless communication system 100 performs the synchronization method steps independently one at a time until all of the plurality of radio devices of the wireless communication system 100 are synchronized with each other, i.e. all of the plurality of radio devices belong to the same timing schedule group.

Figure 5A:
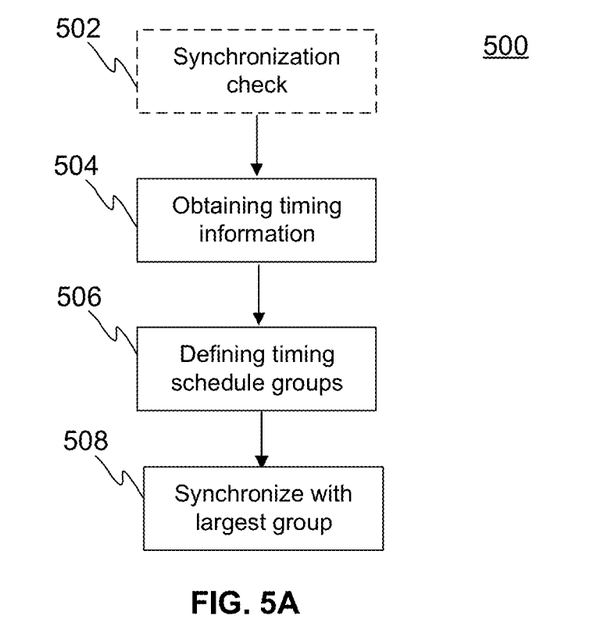
FIGS. 5A and 5B illustrate schematically examples of a synchronization method according to the invention.

Next an example of the decentralized synchronization method 500 according to the invention from the perspective of a radio device 102, 104 is described by referring to FIG. 5A. FIG. 5A schematically illustrates an example of the invention as a flow chart. To save energy the radio device 102, 104 may stay in most power-efficient states, like in a sleep or idle state, most of the time. The radio device may perform the synchronization method 500 in response to receiving timing information from a new radio device within its neighborhood. Alternatively or in addition, the radio device may perform the synchronization method 500 regularly using a timer or using some other triggering mechanisms. At a step 502 a timer of the radio device 102, 104 may indicate a need for synchronization check. The timer value may be defined as a regular interval for all radio devices of the system 100. Alternatively or in addition, the timing of the synchronization check may be defined based on recent information of a neighborhood of the radio device 102, 104. For example, if the previous synchronization has been based on one weak radio link, the radio device 102, 104 may accelerate the start of a next synchronization check.

At a step 504 the radio device 102, 104 of the wireless communication system 100 receives, i.e. obtains, timing information representing the timing schedule of one or more other radio devices within the neighborhood of said radio device 102, 104, i.e. within a communication range, e.g. a radio range, of said radio device 102, 104, at any specific, i.e. certain, time instant. This may be done by scanning by the radio device 102, 104 in order to detect one or more radio transmissions, e.g. messages, transmitted by the one or more other radio devices within the neighborhood and storing the timing information comprised in the received radio transmissions. The neighborhood of said each radio device 102, 104 may comprise at least one-hop neighbors and/or two-hop neighbors. Even though the invention is described in this description mainly referring to one-hop neighbors and/or two-hop neighbors, the neighborhood of each radio device 102, 104 may comprise further-hop neighbors, e.g. three-hop neighbors, four-hop neighbors and so on. The terms "neighbor(s) of a radio device" and "neighborhood of a radio device" mean one or more radio devices whose radio transmissions may be detected by said radio device 102, 104. An extended meaning of the terms "neighbor(s) a radio device" and "neighborhood of a radio device" takes into account the neighbor(s) of the neighbor(s) of said radio device 102, 104, i.e. two-hop neighborhood and two-hop neighbor(s), or even further neighbors, i.e. three-hop neighborhood and three-hop neighbors, four-hop neighborhood and four-hop neighbors, and so on.

The radio device 102, 104 may obtain the timing information from one or more radio transmissions from one or more radio devices within the neighborhood. A timestamp of a reception of the radio transmission from a neighboring radio device is used for defining the time slot boundary of the neighboring radio device. The radio device 102, 104 may obtain the timing information from one or more radio transmissions from one or more direct one-hop neighboring radio devices by detecting the start times of receivals (reception of timestamps) and/or from the content of the radio transmissions. Each radio transmission may comprise timing information representing the timing schedule of the direct one-hop neighboring radio device itself. Alternatively or in addition, the radio device 102, 104 may obtain the timing information from one or more radio transmissions from the one or more direct one-hop neighboring radio devices, wherein each radio transmission comprises timing information representing the timing schedule of one or more neighbors of the direct one-hop neighboring radio device, i.e. timing information that the direct one-hop neighboring radio devices have received from their neighboring radio devices, i.e. timing information within two-hop neighborhood of the radio device 102, 104. The timing information representing the timing schedule of one or more other radio devices within the neighborhood of said radio device 102, 104 may comprise the time slot boundaries $t_{slot\_boundary}$ and/or the time-frequency slot offset value $idx_{phase}$ of the one or more other radio devices within the neighborhood of said radio device 102, 104. Furthermore, the timing information may comprise an identifier of the one or more radio devices.

In response to obtaining the timing information, at a step 506 the radio device 102, 104 defines, based on the obtained timing information, at least one timing schedule group into which the plurality of radio devices are divided and a size of each at least two timing schedule group, i.e. the number of radio devices belonging each timing schedule group. This definition process may be called as a majority voting process. The definition of the at least one timing schedule group at the step 506 depends on the obtained timing information and the different options to perform the definition step will be described later in this application. After defining the at least one timing schedule group, the radio device 102, 104 defines the size of each timing schedule group, i.e. counts the number of radio devices belonging each at least one timing schedule group.

After defining the at least one timing schedule group and the size of the groups, at a step 508 the radio device 102, 104 synchronizes its own timing schedule with the timing schedule of the timing schedule group with the largest size as illustrated in the example of FIG. 5A. In other words, the radio device 102, 104 synchronizes its own timing schedule with the timing schedule of the timing schedule group with the largest size regardless of its own timing schedule. If the timing schedule of the radio device 102, 104 already corresponds to the timing schedule of the timing schedule group with the largest size, the synchronizing at the step 508 comprises (re-)synchronization with already existing timing schedule of the radio device 102, 104 or maintaining the timing schedule of the radio device 102, 104. In both cases the result is that the timing schedule of the radio device 102, 104 is synchronized with the timing schedule of the timing schedule group with the largest size. After the synchronization 508, the radio device 102, 104 may be configured to go back to the idle or sleep state. The timing schedule group with the largest size means the timing schedule group comprising the largest number of radio devices belonging said timing schedule group. If the radio device 102, 104 defines that the system 100 comprises only one timing schedule group, it synchronizes its own timing schedule with the timing schedule of said one timing schedule group, which in this case is defined to have the largest size.

The radio device 102, 104 that defines the at least one timing schedule group may include itself in the definition of the size of the timing schedule groups. Alternatively, the radio device 102, 104 that defines the at least one timing schedule group may exclude itself from definition of the size of the timing schedule groups and join the timing schedule group with the largest size after the exclusion.

Figure 5B:
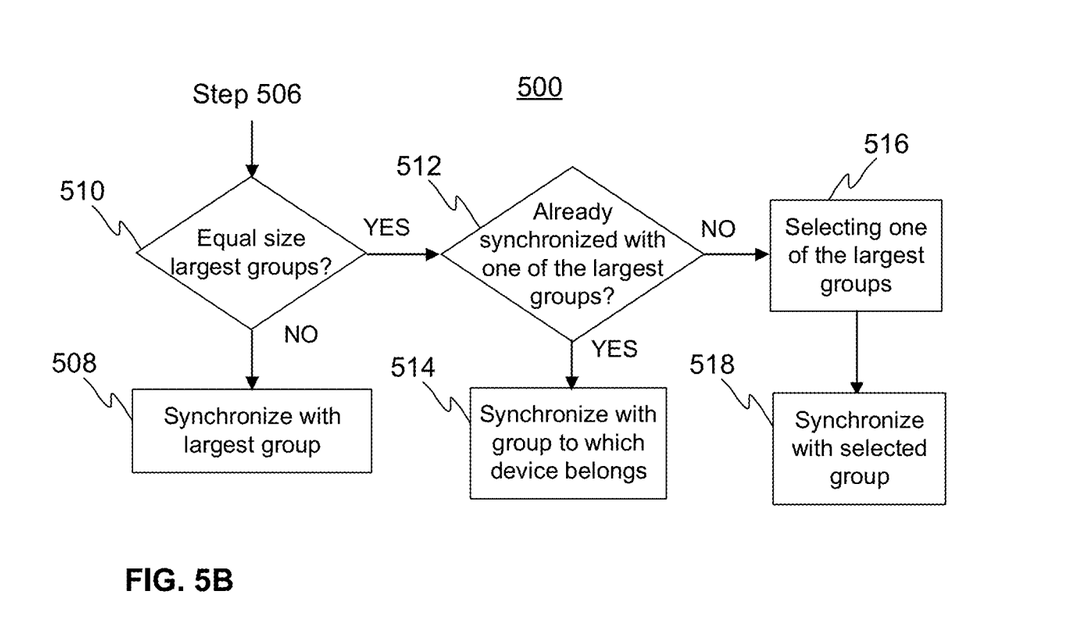

After defining 506 the at least one timing schedule group and the size of the groups, the method may further comprise detecting 510 whether two or more timing schedule groups 106, 108 with the largest size have equal size, i.e. the number of radio devices belonging to two or more timing schedule groups having the largest number of radio devices is equal. This is described by referring to an example illustrated in FIG. 5B. FIG. 5B schematically illustrates an example of the invention as a flow chart. If the radio device 102, 104 detects only one timing schedule group 106, 108 with the largest size at the step 510, the radio device 102, 104 synchronizes 508 its own timing schedule with the timing schedule of the timing schedule group with the largest size as discussed above.

Alternatively, if the radio device 102, 104 detects at the step 510 that two or more timing schedule groups 106, 108 with the largest size have equal size, i.e. the radio device 102, 104 detects a draw situation, the radio device 102, 104 compares at a step 512 its own timing schedule to the timing schedules of the timing schedule groups 106, 108 with the largest size. If the radio device 102, 104 detects at the step 512 that it belongs to one of the largest timing schedule groups, i.e. it is already synchronized with one of the largest timing schedule groups, the radio device 102, 104 synchronizes at a step 514 its own timing schedule with timing schedule of the timing schedule group to which the radio device 102, 104 already belongs. The synchronization at the step 514 comprises (re-)synchronization with already existing timing schedule of the radio device 102, 104 or maintaining the timing schedule of the radio device 102, 104, as discussed above.

If the radio device 102, 104 detects at the step 512 that it does not belong to any of the largest timing schedule groups, the radio device 102, 104 may be configured to select at the step 516 one of the timing schedule groups with the largest size based on a selection criterion. The selection criterion may be based on e.g. a random selection, evaluation order, highest Received Signal Strength Indication, RSSI, or some other criteria or a combination of two or more of the above-mentioned criteria. In the random selection the radio device 102, 104 may solve the draw situation by randomizing the selection of timing schedule group. In the evaluation order, the radio device 102, 104 may solve the draw situation by selecting the first timing schedule group that is evaluated. In the RSSI, the radio device 102, 104 may select the timing schedule group with the largest size from which the highest RSSI may be received. After selecting one of the timing schedule groups with the largest size, the radio device 102, 104 may synchronize at a step 518 its own timing schedule with the timing schedule of the selected one from the timing groups with the largest size. After the synchronization at the step 508, 514 or 518, the radio device 102, 104 may be configured to go back to the idle or sleep state.

Figure 6A:
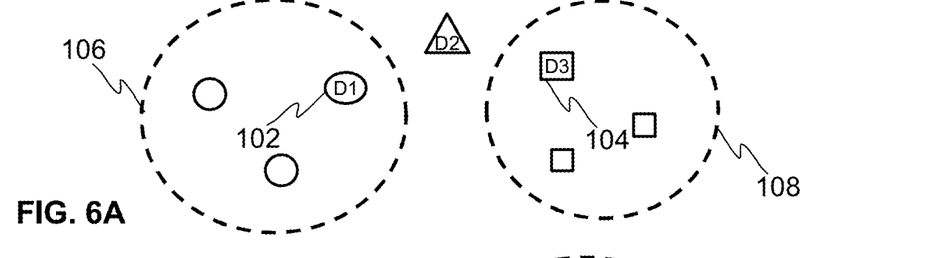
FIGS. 6A-6C illustrate schematically example topologies of a system according to the invention.
Figure 6B:
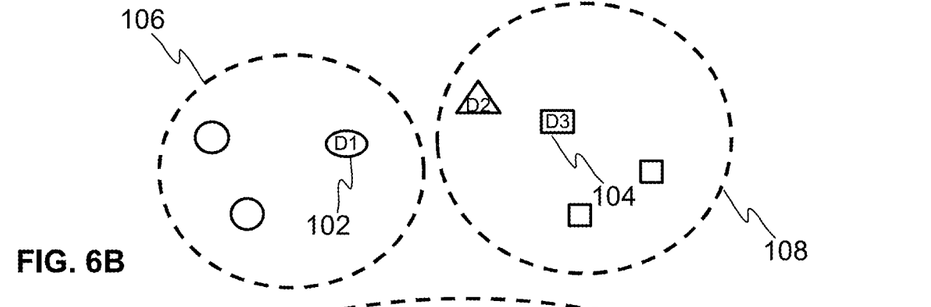
Figure 6C:
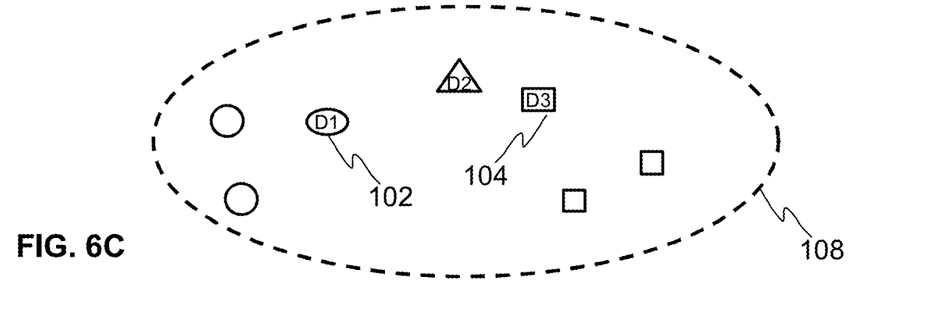

FIG. 6A illustrates schematically an example topology of a system according to the invention, wherein two timing schedule groups 106, 108 comprise equal number of radio devices, i.e. FIG. 6A illustrates schematically an example an example of a draw situation. The plurality of radio devices 102 originally belonging to the first timing schedule group 106 are illustrated with circles and the plurality of radio devices 104 originally belonging to the second timing schedule group 108 are illustrated with squares. Each timing schedule group 106, 108 has a common notion of the time slot boundary within the timing schedule group, but there is no common notion of the time slot boundary between the two timing schedule groups 106, 108. A new radio device D2 that does not yet belong to any of the timing schedule groups of the system 100 (illustrated with triangle) performs the synchronization method as described above. The radio device D2 detects six other radio devices by obtaining 504 timing information of six other radio device and defines that they belong to two timing schedule groups with equal size, i.e. the size of the both timing schedule groups is three. The radio device D2 may solve the draw situation by randomizing the selection of timing schedule group or using some other criteria. As an example, the other criteria may comprise the RSSI based selection. In this example, the radio device D2 may detect from one of the radio devices (for example radio device D3) of the timing schedule group 108 highest signal strength. Thus, the radio device D2 selects the timing schedule group 108 and synchronizes its timing schedule with the timing schedule of timing schedule group 108. Alternatively, the evaluation order-based selection may be used, wherein the radio device D2 may solve the draw situation by selecting the first timing schedule group that is evaluated. Alternatively, a combination of two or more of the above-mentioned criteria may be used to solve the draw situation. FIG. 6B illustrates an example of a situation when the radio device D2 is synchronized with the timing schedule group 108. FIG. 6C illustrates an example of a situation wherein all the devices have performed the synchronization method as described above and synchronized with the timing schedule group 108 with the largest size. In the example situation of FIG. 6C, the common notion of time slot boundary between all seven radio devices is reached, when all the radio devices of the original timing schedule group 106 have performed the synchronization method as described above and synchronized their own timing schedules with the timing schedule of the timing schedule group 108 with the largest size. This approach to solve the draw may be applied with all embodiments of the invention.

Figure 6D:
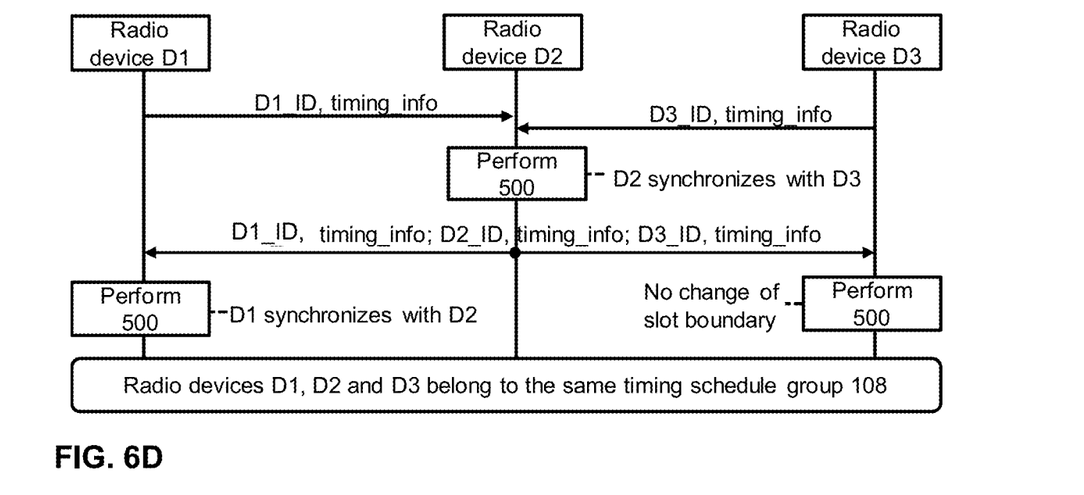
FIG. 6D illustrates schematically an example message sequence between three radio devices.

FIG. 6D illustrates schematically an example message sequence between three radio devices D1-D3 capable to share the timing information representing the timing schedules of the three radio devices D1-D3. The timing information (timing_info in FIG. 6D) of each radio device D1-D3 may comprise the time slot boundary $t_{slot\_boundary}$ and/or the time-frequency slot offset value $idx_{phase}$ of said radio device D1-D3. Furthermore, each radio device D1-D3 may include its identifier (e.g. D1_ID) in the timing information. The message sequence may be applied for example to the example topologies of FIGS. 6A-C. In this example, the radio devices D1 and D3 cannot directly communicate with each other, e.g. due to long distance, but they are two-hop neighbors because the radio device D2 in the middle may communicate with both radio devices D1 and D3. A radio device D2 detects a message transmission from a radio device D1 that belongs to a timing schedule group 106 and a radio device D3 that belongs to a second timing schedule group 108 e.g. as in the example topology of FIG. 6A. The radio device D2 may perform the synchronization method 500 as described above and as a result synchronizes itself with the second timing schedule group 108 to which the radio device D3 belongs. At some point, the radio device D1 detects the radio device D2 and performs the synchronization method 500 as described above. As a result, the radio device D1 synchronizes itself with the timing schedule group with the largest size, i.e. the second timing schedule group 108 in this example. One by one, the radio devices of the original first timing schedule group 106 detect the updated situation and performs the synchronization method 500 as described above. Finally, as in the example of FIG. 6C all the radio devices have the same notion of the time slot boundary and belong to the same timing schedule group, i.e. the second timing schedule group 108 in this example. In this example, each radio device performs the synchronization method 500 in response to receiving timing information from a new radio device. Alternatively or in addition, synchronization method 500 may be performed regularly using a timer or using some other triggering mechanisms (e.g. the step 502).

Next an example of a definition of the at least one timing schedule group at the step 506, when the timing information obtained 504 by the radio device 102, 104 comprises the time slot boundaries $t_{slot\_boundary}$ of the timing schedules of the one or more other radio devices within the neighborhood of the radio device 102, 104, is described. This may be implemented with the wireless communication system 100 using TDMA technique and/or FTDMA technique. Each radio device of the wireless communication system 100 is capable of detecting time slot boundaries of the one-hop neighboring radio devices, by detecting the reception time-stamps of the received radio transmissions from the one-hop neighboring radio devices. Alternatively, or in addition, the transmission times, i.e. the time slot boundaries, of the one-hop neighboring radio devices and/or two-hop neighboring radio devices may be included in the radio transmission, i.e. messages, transmitted by the one-hop neighboring radio devices. In a network with fixed length time slot $t_{slot}$ the radio device 102, 104 may define the slot boundary difference value $t_{delta}$ between each radio device among the neighboring radio devices with the following equation:

$$t_{delta} = |t_{slot\ boundary\_D1} - t_{slot\ boundary\_D2}| \bmod t_{slot} \quad (1)$$

where $t_{slot\_boundary\_D1}$ is the next slot boundary of a first radio device (D1), $t_{slot\_boundary\_D2}$ is the next slot boundary of a second radio device (D2) and mod $t_{slot}$ is a modulo operation with $t_{slot}$ as the divisor. The modulo operation is performed to normalize the obtained time slot boundaries by using a common time slot length $t_{slot}$ of the wireless communication system 100.

The above equation (1) defines a normalized, i.e. shortest distance between the time slot boundaries of the first radio device D1 and the second radio device D2. Thus, the equation (1) is presented in two parts and two results are obtained from it. The smaller slot boundary difference value $t_{delta}$ may be selected to be used in the next steps. By the defining slot boundary difference values $t_{delta}$ between each radio device among the one-hop neighbors and/or two-hop neighbors, the radio device 102, 104 may form a view of timing schedules existing within its neighborhood.

Defining the at least one timing schedule group and the size of each timing schedule group at the step 506 may comprise normalizing the obtained time slot boundaries $t_{slot\_boundary}$ of one or more other radio devices by using a common time slot length $t_{slot}$ of the wireless communication system 100 and defining the time slot difference values $t_{delta}$ between the normalized time slot boundaries of the neighboring radio devices by using the above equation (1). After defining the time slot difference values, the radio device 102, 104 may compare each defined time slot difference value $t_{delta}$ to the timing difference limit value $t_{delta\_limit}$ to define the at least one timing schedule group, i.e. the number of timing schedule groups and the number of radio devices belonging to each timing schedule group. If the timing difference value $t_{delta}$ between two radio devices is smaller than the timing difference limit value $t_{delta\_limit}$ (i.e. $t_{delta} < t_{delta\_limit}$), the two radio devices are interpreted to belong to the same timing schedule group. Alternatively, if the timing difference value $t_{delta}$ is equal or larger than the timing difference limit value (i.e. $t_{delta} \geq t_{delta\_limit}$), the two radio devices are interpreted to not to belong to the same timing schedule group. In the presence of multiple, e.g. four neighboring radio devices, the result of timing difference value comparison may be that there are more than two timing schedule groups. For example, first two neighboring radio devices may be detected to belong to the same timing schedule group (i.e. their $t_{delta} < t_{delta\_limit}$), but a third and a fourth radio device may have timing difference value larger than the timing difference limit value (i.e. $t_{delta} > t_{delta\_limit}$) when compared to the first two radio devices. In addition, in this example, the mutual timing difference value between the third and the fourth radio device is detected to be larger than the timing difference limit value (i.e. $t_{delta} > t_{delta\_limit}$). This concludes that there are three timing schedule groups among the four neighboring radio devices. After defining the number of the timing schedule groups and the radio devices belonging to each timing schedule group, the radio device 102, 104 defines the size of the defined at least one timing schedule group, i.e. count the number of radio devices belonging to each timing schedule group. In the above example situation, the first timing schedule group comprises two radio devices and the two other timing schedule groups comprise one radio device in each group. The radio device 102, 104 that defined these three timing schedule groups is configured to synchronize its timing schedule with the timing schedule of the first timing schedule group, because it has the largest size, as discussed above referring to the example of FIG. 5A. If in the above example situation there were three neighboring devices that each have mutual timing difference higher than the limit value (i.e. each $t_{delta} > t_{delta\_limit}$), the radio device 102, 104 detects a draw situation and may solve the draw situation as discussed above referring to the example of FIG. 5B.

Figure 7A:
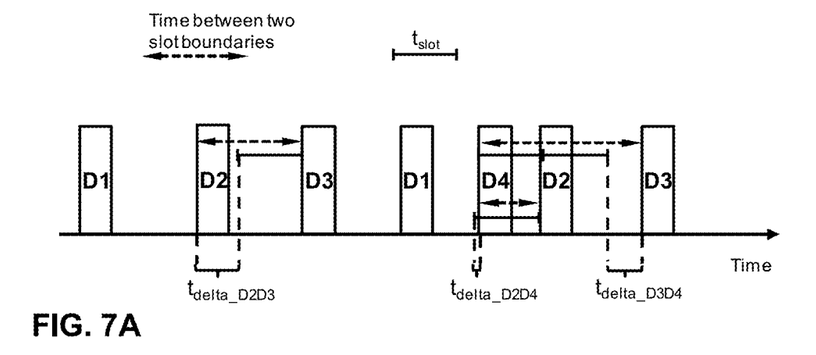
FIGS. 7A and 7B illustrate schematically an example synchronization situation between radio devices implemented in a Time Division Multiple Access (TDMA) arrangement.
Figure 7B:
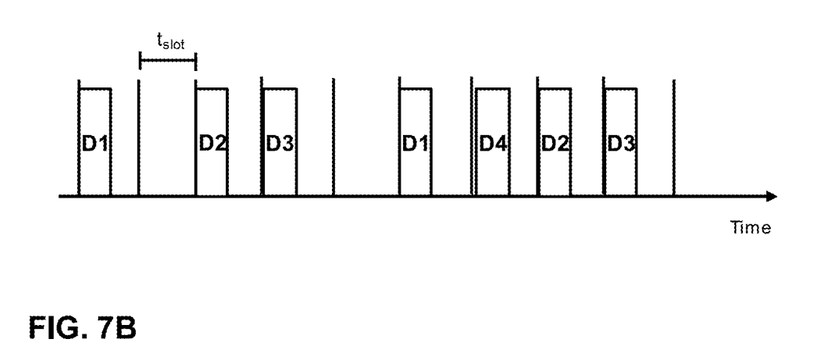

FIGS. 7A and 7B illustrate schematically an example synchronization situation between radio devices implemented in the TDMA arrangement, wherein the timing information obtained 504 by the radio device comprises the time slot boundaries $t_{slot\_boundary}$ of the timing schedules of the one or more other radio devices within the neighborhood of the radio device. In this example, the wireless communication system 100 comprises four radio devices D1-D4. The rectangles labeled with the name of the radio device D1-D4 illustrate radio transmissions of the radio devices D1-D4, i.e. the radio devices D1-D3 transmits each two radio transmissions and the radio device D4 transmits one radio transmission. FIG. 7A illustrates a non-synchronized situation, wherein there is no common notion of the time slot boundary $t_{slot\_boundary}$ between the radio devices D1-D4. The radio devices D1-D4 resides all in each other's communication range, i.e. within the one-hop neighborhood, and use a commonly agreed regular time slot length $t_{slot}$, i.e. time slot length $t_{slot}$ has fixed length, on a common frequency channel. In this example, the radio device D1 is the first radio device that is configured to perform the synchronization steps described above. The radio device D1 obtains 504 timing information comprising time slot boundaries of the other radio devices D2-D4. First the radio device D1 normalizes the obtained time slot boundaries of the other radio devices D2-D4 by using the common time slot length of the system 100 and defines slot boundary difference values $t_{delta}$ between the other, i.e. neighboring, radio devices D2-D4 by using the equation (1). The radio device D1 defines 506 the at least one timing schedule group by comparing the defined slot boundary difference values $t_{delta}$ and the timing difference limit value, $t_{delta\_limit}$ and the size of the at least one timing schedule group, i.e. the number of radio devices belonging to each timing schedule group. In this example, the defined slot boundary difference values $t_{delta}$ are less than $t_{delta\_limit}$ between the radio devices D2 and D4, i.e. $t_{delta\_D2D4} <$ and more than $t_{delta\_limit}$ between the radio devices D2 and D3, i.e. $t_{delta\_D2D3} > t_{delta\_limit}$, as well as between the radio devices D3 and D4, i.e. $t_{delta\_D3D4} > t_{delta\_limit}$. Therefore, the radio device D1 defines 506 that the system 100 comprises a first timing schedule group to which the radio devices D2 and D4 belong and a second timing schedule group to which the radio device D3 belong. The size of the first timing schedule group is two and the size of the second timing schedule group is one. This means that the first timing schedule group has the largest size, i.e. the majority of the radio devices belong to the first timing schedule group. Next the radio device D1 synchronizes its own timing schedule with the timing schedule of the first timing schedule group. As in this example the normalized time slot boundary of the radio device D1 is within $t_{delta\_limit}$ of the normalized time slot boundary of the first timing schedule group, i.e. the normalized time slot boundary of the radio device D1 corresponds to the normalized time slot boundary of the first timing schedule group, the radio device D1 is already synchronized with the timing schedule group with the largest size, i.e. the first timing schedule group, and the synchronization comprises (re-)synchronization with already existing timing schedule of the radio device 102, 104 or maintaining the timing schedule of the radio device 102, 104, as discussed above. Each radio device D2-D4 of the system performs the same synchronization method steps each at a time. When the radio device D3 performs the same synchronization method steps, the result is that the radio device D3 recognizes that it belongs to the second timing schedule group, i.e. minority group, and the radio device synchronizes its timing schedule with the timing schedule of the timing schedule group with the largest size, i.e. the first timing schedule group in this example, which is represented by the majority of the radio devices D1, D2, and D4. In this example the synchronization of the timing schedule of the radio device D3 with the timing schedule of the timing schedule group with the largest size means that the radio device D3 changes its time slot boundary to the time slot boundary of the first timing schedule group. The result is that the radio devices D1-D4 are synchronized and have a common notion of the time slot boundary $t_{slot\_boundary}$ between the radio devices D1-D4, i.e. all the devices belong to the same timing schedule group as illustrated in FIG. 7B, wherein a synchronized situation is presented. The vertical lines in FIG. 7B illustrate the normalized slot boundaries from the perspective of the radio device D1. It may be seen that there is minor difference between the normalized slot boundary of the radio device D1 and the slot boundary of the radio device D4, but the difference is less than $t_{delta\_limit}$ Thus, the radio device D4 may be interpreted to belong to the same timing schedule group with the other radio devices D1-D3 of the system.

Figure 8:
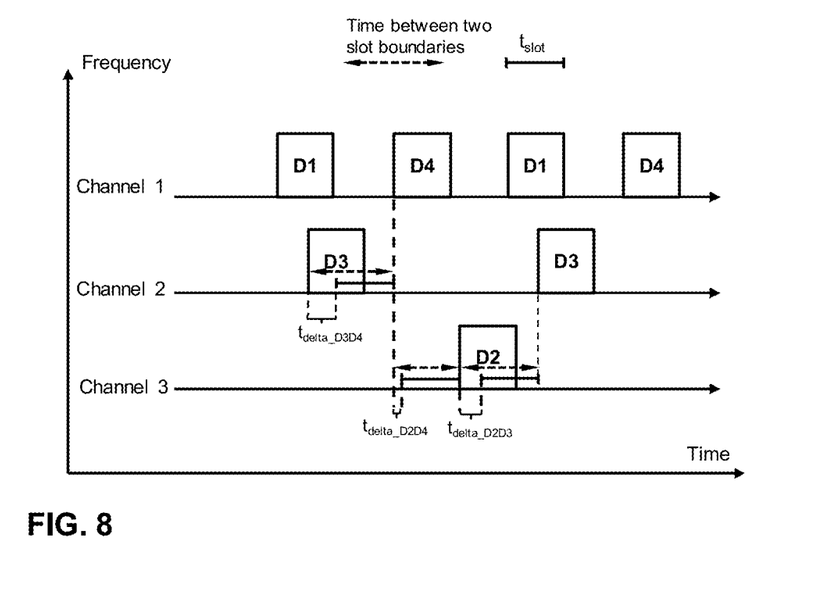
FIG. 8 illustrates schematically an example synchronization situation between radio devices implemented in an FTDMA arrangement.

FIG. 8 illustrates schematically an example synchronization situation between radio devices implemented in the FTDMA arrangement, wherein the timing information obtained 504 by the radio device comprises the time slot boundaries $t_{slot\_boundary}$ of the timing schedules of the one or more other radio devices within the neighborhood of the radio device. In this example, the wireless communication system 100 comprises four radio devices D1-D4 using time slots on three frequency channels. FIG. 8 illustrates a non-synchronized situation, wherein there is no common notion of the time slot boundary $t_{slot\_boundary}$ between the radio devices D1-D4. In this example, the radio device D1 is the first radio device that is configured to perform the synchronization steps described above. The radio device D1 obtains 504 timing information comprising time slot boundaries of the other radio devices D2-D4. First the radio device D1 normalizes the obtained time slot boundaries of the other radio devices D2-D4 independently of the frequency channels they use by using the common time slot length of the system 100 and defines slot boundary difference values $t_{delta}$ between the other radio devices D2-D4 by using the equation (1). The radio device D1 defines 506 the at least one timing schedule group by comparing the defined slot boundary difference values $t_{delta}$ and the timing difference limit value, $t_{delta\_limit}$ and the size of each timing schedule group, i.e. the number of radio devices belonging to each timing schedule group. In this example, the defined slot boundary difference values $t_{delta}$ are less than $t_{delta\_limit}$ between the radio devices D2 and D4 i.e. $t_{delta\_D2D4} < t_{delta\_limit}$; and more than $t_{delta\_limit}$ between the radio devices D2 and D3, i.e. $t_{delta\_D2D3} > t_{delta\_limit}$, as well as between the radio devices D3 and D4, i.e. $t_{delta\_D3D4} > t_{delta\_limit}$. Therefore, the radio device D1 defines 506 that the system 100 comprises a first timing schedule group to which the radio devices D2, and D4 belong and a second timing schedule group to which the radio device D3 belong. The size of the first timing schedule group is two and the size of the second timing schedule group is one. This means that the first timing schedule group has the largest size, i.e. the majority of the radio devices belong to the first timing schedule group. Next the radio device D1 synchronizes its own timing schedule with the timing schedule of the first timing schedule group. As in this example the normalized time slot boundary of the radio device D1 is within $t_{delta\_limit}$ of the normalized time slot boundary of the first timing schedule group, i.e. the normalized time slot boundary of the radio device D1 corresponds to the normalized time slot boundary of the first timing schedule group, the radio device D1 is already synchronized with the timing schedule group with the largest size, i.e. the first timing schedule group, and the synchronization comprises (re-)synchronization with already existing timing schedule of the radio device 102, 104 or maintaining the timing schedule of the radio device 102, 104, as discussed above. Each other radio devices D2-D4 of the system performs the same synchronization method steps each at a time. When the radio device D3 performs the same synchronization method steps, the result is that the radio device D3 recognizes that it belongs to the second timing schedule group, i.e. minority group, and the radio device D3 synchronizes its timing schedule with the timing schedule of the timing schedule group with the largest size, i.e. the first timing schedule group in this example, which is represented by the majority of the radio devices D1, D2, and D4. In this example the synchronization of the timing schedule of the radio device D3 with the timing schedule of the timing schedule group with the largest size means that the radio device D3 changes its time slot boundary to the time slot boundary of the first timing schedule group. The result is that the radio devices D1-D4 are synchronized and have a common notion of the time slot boundary $t_{slot\_boundary}$ between the radio devices D1-D4, i.e. all the devices belong to the same timing schedule group, even if they are not necessarily all on the same frequency channel.

Next an example of a definition of the at least one timing schedule group at the step 506, when the timing information obtained 504 by the radio device 102, 104 comprises the time-frequency slot offset value $idx_{phase}$ of the timing schedules of the one or more other radio devices within the neighborhood of the radio device 102, 104, is described. This may be implemented with the wireless communication system 100 in FTDMA arrangement with the FHSS sequence. Each radio device of the wireless communication system 100 is capable of transmitting the timing information representing its timing schedule comprising e.g. the time-frequency slot offset value $idx_{phase}$. Moreover, each radio device of the wireless communication system 100 is aware of its own timing schedule comprising e.g. the time-frequency slot offset value $idx_{phase}$. Defining the at least one timing schedule group at the step 506 may comprise comparison between the obtained time-frequency slot offset values $idx_{phase}$ of the one or more radio devices within the neighborhood to define the number of timing schedule groups and the radio devices belonging to each timing schedule group. Radio devices having the same time-frequency slot offset values $idx_{phase}$ belongs to the same time schedule group. After defining the at least one timing schedule group, the radio device 102, 104 may define the size of each timing schedule group, i.e. count the number of radio devices belonging to each timing schedule group. After defining the at least one timing schedule group and the size of the groups, the radio device 102, 104 may perform the synchronization step(s) as described above referring to FIG. 5A or FIG. 5B.

After performing the synchronization, the radio device 102, 104 may further define a resulting frequency channel index with the following equation:

$$\text{Freq} = |f_{min} + (idx_{base} + idx_{phase})| \bmod f_{max}, \quad (2)$$

where $idx_{base}$ is a base index value that refers to the frequency channel the radio device 102, 104 originally started the FHSS sequence, $idx_{phase}$ is the the time-frequency slot offset value defined by the synchronization method and incremented at every cycle or at every slot boundary if the cycles differ, and $f_{min}$ and $f_{max}$ are the minimum and maximum frequency channel indexes available in the system.

If the timing information comprises the time slot boundary $t_{slot\_boundary}$ and the time-frequency slot offset value $idx_{phase}$ of the timing schedules of the one or more other radio devices within the neighborhood of the radio device 102, 104, the radio device 102, 104 may be configured to first define the timing schedule groups at the step 506 based on the time slot boundaries and to perform the synchronization according to the steps 508-518 as described above using the timing schedule groups defined based on the time slot boundaries and after that the radio device 102, 104 may be configured to define the timing schedule groups at the step 506 based on the time-frequency slot offset values and to perform the synchronization according to the steps 508-518 as described above using the timing schedule groups defined based on the time-frequency slot offset values or vice versa. The synchronization performed using the timing schedule groups defined based on the time slot boundaries may be called as time-based synchronization and the synchronization performed using the timing schedule groups defined based on the time-frequency slot offset values may be called as frequency-based synchronization. The frequency-based synchronization may be combined also with any other time-based synchronization than the time-based synchronization described in this application. Similarly, the time-based synchronization may be combined with any other frequency-based synchronization than the frequency-based synchronization described in this application.

Figure 9:
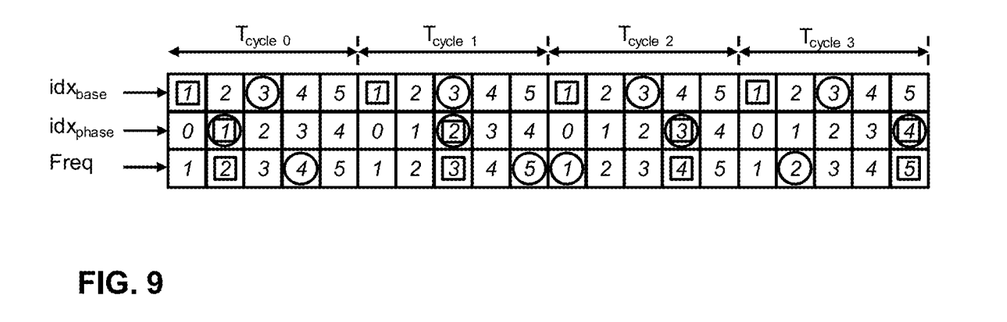
FIG. 9 illustrates schematically an example of a synchronized situation between radio devices implemented in an FTDMA arrangement with an FHSS sequence.

FIG. 9 illustrates schematically an example of a synchronized situation between radio devices implemented in the FTDMA arrangement with the FHSS sequence, wherein the timing information obtained 504 by the radio device comprises the time-frequency slot offset value $idx_{phase}$ of the timing schedules of the one or more other radio devices within the neighborhood of the radio device. In this example, the wireless communication system 100 comprises two radio devices D1 (illustrated with squares in FIG. 9) and D2 (illustrated with circles in FIG. 9) using time slots on five frequency channels and the minimum frequency channel index $f_{min}$ is 1 and the maximum frequency channel index $f_{max}$ is 5. In this example, a radio device D1 has the base index value $idx_{base}$ of 1 and D2 has the base index value $idx_{base}$ value of 3, i.e. the radio device D1 has originally started the FHSS sequence from the frequency channel 1 and the radio device D2 has originally started the FHSS sequence from the frequency channel 3. The radio devices D2 and D3 have a common notion of the the time-frequency slot offset value $idx_{phase}$ value, which is incremented by one at every cycle. According to the equation (2) presented above, the radio device D1 defines its frequency channel index as 2 during cycle 0, while the radio device D2 defines its frequency channel index as 4.

Figures 10A, 10B:
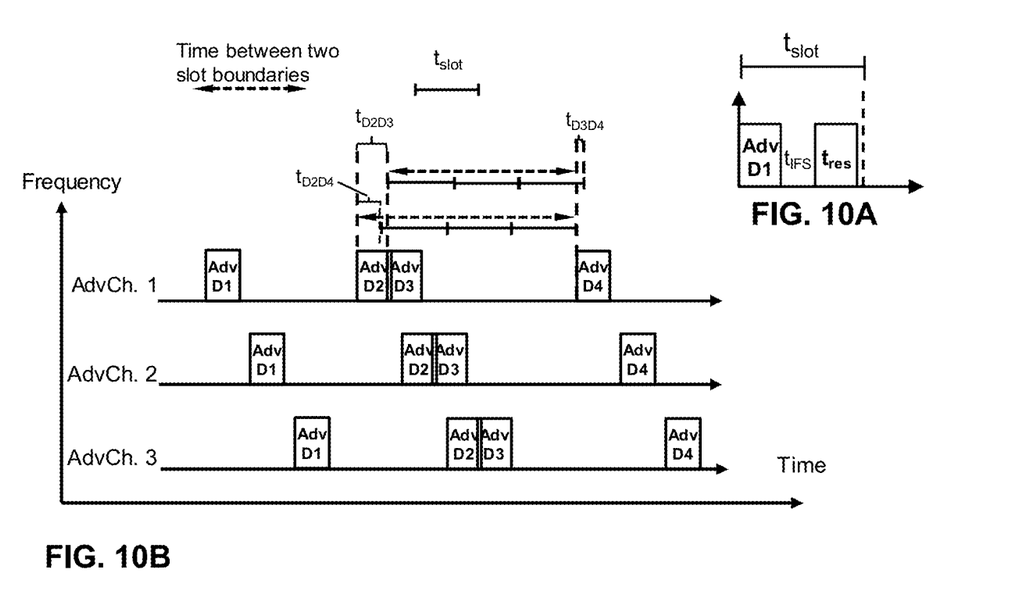
FIG. 10A illustrates an example of a common time slot length with a Bluetooth Low Energy (BLE) advertising protocol.
FIGS. 10B-10C illustrate an example synchronization situation between radio devices capable of transmitting BLE advertising packets.

The above described different embodiments of the invention may be implemented in a wireless communication in the system 100 based on Bluetooth Low Energy (BLE) advertising protocol. The BLE advertising protocol defines an advertising event that comprises transmitting an BLE advertising packet at pre-defined advertising channels. The advertising event may be repeated once per advertising cycle. There is no time-coordination defined between the devices transmitting the advertising packets and no detection of possible collisions due to overlapping transmissions. Therefore, a randomized advertising delay may be applied at every advertising interval to avoid transmission collisions. The different embodiments of the synchronization method 500 according to the invention described above may be applied to the wireless communication system 100 using BLE advertising protocol by defining a time-grid, wherein the common time slot length $t_{slot}$ of the system 100 covers a maximum length of an advertising packet, radio turnaround time $t_{IFS}$, and a maximum length, i.e. response time, of possible response packet. FIG. 10A illustrates an example of the common time slot length $t_{slot}$ with the BLE advertising protocol.

Figure 10C:
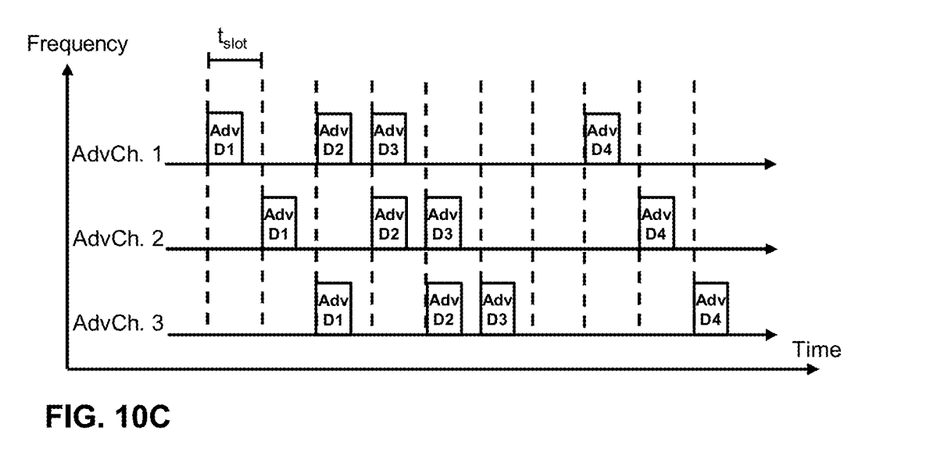

FIG. 10B illustrates an example synchronization situation between radio devices capable of transmitting BLE advertising packets on three advertising frequency channels. The timing information, i.e. advertising timing information, comprising the time slot boundary $t_{slot\_boundary}$ and/or the time-frequency slot offset value $idx_{phase}$ may be included in the BLE advertising packets, i.e. the transmitted BLE advertising packets comprises the timing information. In this example, the wireless communication system 100 comprises four advertiser radio devices AdvD1-AdvD4 using time slots on three advertising frequency channels AdvCh1-AdvCh3. FIG. 10B illustrates an example of a non-synchronized situation, wherein there is no common notion of the time slot boundary $t_{slot\_boundary}$ and/or the time-frequency slot offset value $idx_{phase}$ between the advertiser radio devices AdvD1-AdvD4. Each advertiser radio device AdvD1-AdvD4 may perform individually the synchronization method according to any of the embodiments described above. Each advertiser radio device AdvD1-AdvD4 may synchronize its own BLE advertising timing schedule with the BLE advertising timing schedule group 106, 108 with the largest size as discussed above. FIG. 10C illustrates an example a synchronized situation, wherein the advertiser radio devices AdvD1-AdvD4 are synchronized and have a common notion of the time slot boundary $t_{slot\_boundary}$ and/or the time-frequency slot offset value $idx_{phase}$ between the advertiser the radio devices AdvD1-AdvD4, i.e. all the devices belong to the same BLE advertising timing schedule group. In other words, in the synchronized situation the timing schedules of the transmissions of the BLE advertising packets by the radio devices AdvD1-AdvD4 on the advertising frequency channels are synchronized.

Alternatively, the BLE advertising packets may be transmitted on advertising frequency channels without synchronization. The BLE advertising packets may further carry, i.e. provide, timing information about a synchronized communication ongoing on one or more other channels, e.g. on one or more data channels. Such timing information may comprise e.g. data channel index and/or the start timing of the next data channel transmission in relation to the transmission time of the advertising packet. This enables sharing the timing information about a synchronized communication by means of a non-synchronized BLE advertising protocol. The synchronization on the one or more other channels may be provided by performing the synchronization method according to any of the above described embodiments of the invention. To get a two-hop coverage in the timing schedule comparisons, the BLE advertiser devices may include in their BLE advertising packets their view on the number of the BLE advertiser devices of each at least one timing schedule group. Based on the received BLE advertising packets each advertiser device may therefore define the at least one timing schedule group and the size of each timing schedule group in their two-hop neighborhood.

Figure 10D:
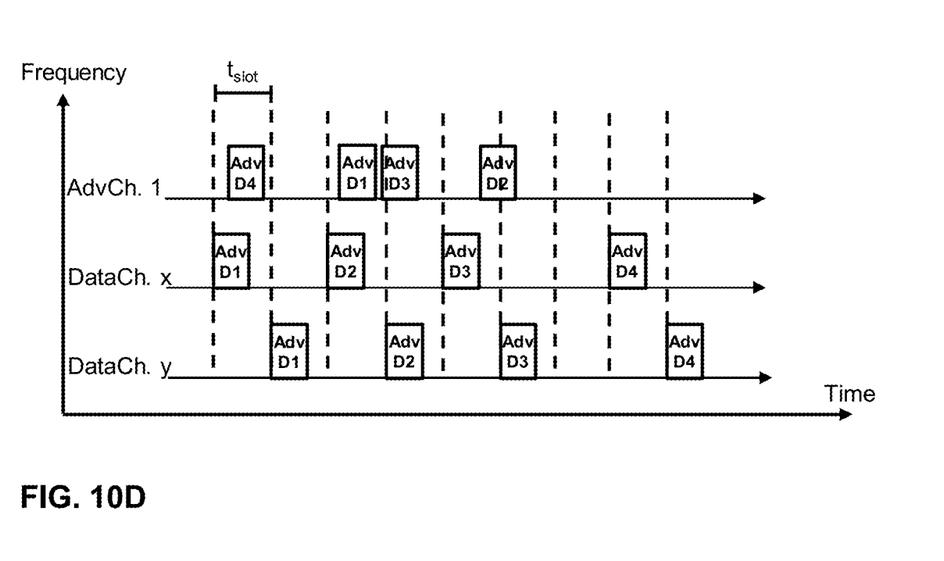
FIG. 10D illustrates an example synchronization situation between radio devices transmitting BLE data packets.

FIG. 10D schematically illustrates an example synchronization situation, wherein the synchronization method 500 according to the invention may be applied on the communication on at least one or more BLE data channels instead of BLE advertising frequency channels. Each advertiser radio device AdvD1-AdvD4 may transmit BLE advertising packets using its own advertising timing schedule and does not perform actions to synchronize its BLE advertising timing schedule, i.e. timing schedule of advertising packets, with other radio devices AdvD1-AdvD4 within the system 100. However, the advertiser radio devices AdvD1-AdvD4 may include in their BLE advertising packets information about the synchronized communication on the one or more other channels, e.g. BLE data channels. Such information may comprise e.g. data channel index and/or the start timing of the next data channel transmission in relation to the transmission time of the advertising packet. In addition, the advertising packet may comprise information about FHSS sequence, for example the $idx_{phase}$ value. Therefore, any radio device who wants to participate the synchronized communication on the one or more BLE data channels in the system may define the at least one timing schedule group and the size of each timing schedule group by listening to the advertising packets only. Using this information, any radio device may also make its own decision to choose the largest timing schedule group in its neighborhood. Each radio device may synchronize its own timing schedule of the BLE data channel transmissions with the timing schedule of the BLE data channel transmissions of the timing schedule group 106, 108 with the largest size as discussed above. In the synchronized situation timing schedules of the BLE data channel transmissions of the radio devices AdvD1-AdvD4 on the BLE data channels are synchronized, but the timing schedules of the transmissions of the BLE advertising packets by the radio devices AdvD1-AdvD4 on the advertising frequency channels may be non-synchronized. This embodiment may be applied for example for low power mesh networks, wherein the detection of mesh networking devices is done by scanning the advertising channels, but the actual mesh data communication happens on other channels.

Alternatively, the synchronization method according to the invention may be implemented in the communication on one or more BLE data channels to synchronize the timing schedules of the data channel transmissions of the radio devices on the one or more BLE data channels (non-advertising channels) without including timing information in the BLE advertising packets. The timing information may be included in the data channel transmissions of one or more other radio devices within the neighborhood. In other words, each radio device may synchronize its timing schedule of the BLE data channel transmissions with the timing schedule of the BLE data channel transmissions of the timing schedule group 106, 108 with the largest size.

Figure 11:
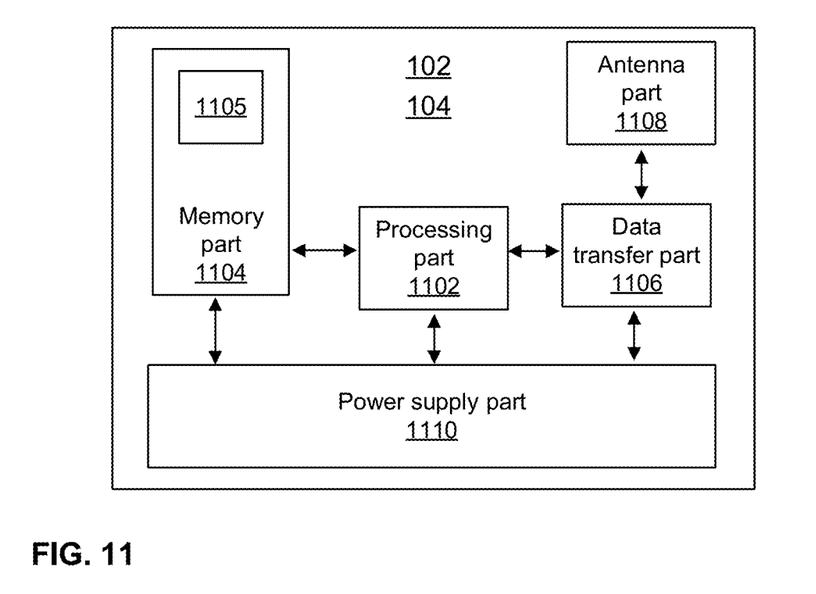
FIG. 11 illustrates an example of a radio device (apparatus) according to the invention.

FIG. 11 illustrates an example of a radio device (apparatus) 102, 104. The radio device 102, 104, 106 comprises a processing part 1102 that is configured to perform user and/or computer program (software) initiated instructions, and to process data in order to run an application and communication protocol. The processing part 1102 may comprise at least one processor, e.g. one, two, or three processors. The radio device 102, 104 further comprises a memory part 1104 in order to store and to maintain data. The data may be instructions, computer programs, and data files. The memory part 1104 may comprise at least one memory, e.g. one, two, or three memories.

The radio device 102, 104 further comprises a data transfer part 1106 and an antenna part 1108. The radio device 102, 104 uses the data transfer part 1106 in order to transmit commands, requests, messages, and data to at least one of other radio devices of the wireless communication system 100 via the antenna part 1108. The data transfer part 1106 also receives commands, requests, messages, and data from at least one of the other radio devices 102, 104 via the antenna part 1108 in the system 100. The radio device 102, 104 further comprises a power supply part 1110. The power supply part 1110 comprises components for powering the radio 102, 104, e.g. a battery and a regulator.

The memory part 1102 comprises a data transfer application for operating, i.e. controlling, the data transfer part 1106, an antenna application for operating the antenna part 1108, and a power supply application for operating the power supply part 1110.

The memory part 1104 comprises also synchronization application 1105, i.e. a computer program, comprising instructions which, is configured to use at least one of parts 1106, 1108, 1110 in order to perform, i.e. carry out, at least the operations, i.e. method steps, of the radio device 102, 104 described above in this description part and figures, when it is run, i.e. executed, by a computer, e.g. by the radio device 102, 104 by means of the processing part 1102.

The computer program may be stored in a tangible non-volatile computer readable medium, e.g. an USB stick or a CD-ROM disc.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A wireless communication system comprising a plurality of radio devices, wherein each radio device of the plurality of radio devices is configured to independently:
   obtain timing information representing timing schedules of one or more other radio devices within its neighborhood;
   define, based on the obtained timing information, at least one timing schedule group into which the plurality of radio devices are divided and a size of each at least one timing schedule group by counting a number of radio devices belonging to each at least one timing schedule group; and
   synchronize its own timing schedule with the timing schedule of the timing schedule group with the largest size.

2. The wireless communication system according to claim 1, wherein if two or more timing schedule groups with the largest size have an equal size, said each radio device is further configured to:
   compare its own timing schedule to the timing schedules of the two or more timing schedule groups with the largest size; and
   synchronize its own timing schedule with the timing schedule of the timing schedule group to which it belongs, if the radio device detects that it belongs to one of the largest timing schedule groups; or
   select one of the timing schedule groups with the largest size based on a selection criterion and synchronize its own timing schedule with the timing schedule of the selected one from the timing schedule groups with the largest size.

3. The wireless communication system according to claim 2, wherein the selection criterion is random-based selection, evaluation order-based, or highest Received Signal Strength Indication, RSSI-based selection, or a combination of two or more such criteria.

4. The wireless communication system according to claim 1, wherein the timing information is obtained from one or more radio transmissions from one or more other radio devices within the neighborhood, wherein each radio transmission comprises timing information representing the timing schedule of the other radio device itself and/or timing in-formation representing the timing schedule of one or more neighbors of the other radio devices.

5. The wireless communication system according to claim 1, wherein the timing information comprises time slot boundaries of the timing schedules of the one or more other radio devices within the neighborhood.

6. The wireless communication system according to claim 5, wherein the definition of the at least one timing schedule group comprises:
   normalizing the obtained time slot boundaries by using a common time slot length of the wireless communication system
   defining time slot difference values between the normalized time slot boundaries of the one or more other radio devices within the neighborhood, and
   comparing the defined time slot difference values to a timing difference limit value.

7. The wireless communication system according to claim 1, wherein the timing information comprises a time-frequency slot offset value of the timing schedules of the one or more other radio devices within the neighborhood.

8. The wireless communication system according to claim 7, wherein the definition of the at least one timing schedule group comprises comparison between the obtained time-frequency slot offset values of the one or more other radio devices within the neighborhood.

9. The wireless communication system according to claim 1, wherein the wireless communication system is based on Bluetooth Low Energy, BLE, advertising protocol.

10. The wireless communication system according to claim 9, wherein the timing information is obtained from one or more BLE advertising packets comprising timing information on one or more advertising channels and transmitted by the one or more other radio devices within the neighborhood, wherein each radio device is configured to synchronize its own BLE advertising timing schedule with the BLE advertising timing schedule group with the largest size.

11. The wireless communication system according to claim 9, wherein the timing information is obtained from:
  one or more BLE advertising packets comprising timing information on one or more data channels and transmitted by the one or more other radio devices within the neighborhood, or
  one or more BLE data channel transmissions from one or more other radio devices within the neighborhood,
  wherein each radio device is configured to synchronize its own timing schedule of the BLE data channel transmissions with the timing schedule of the BLE data channel transmissions of the timing schedule group with the largest size.

12. A synchronization method for the wireless communication system according to claim 1, the method comprises:
  obtaining, by each radio device of the system, timing information representing timing schedules of one or more other radio devices within its neighborhood;
  defining, by each radio device of the system, based on the obtained timing information, at least one timing schedule group into which the plurality of radio devices are divided and a size of each at least one timing schedule group by counting a number of radio devices belonging to each at least one timing schedule group; and
  synchronizing, by each radio device of the system, its own timing schedule with the timing schedule of the timing schedule group with the largest size.

13. A radio device for a wireless communication system, wherein the radio device comprises:
  a processing circuit, and
  a data transfer circuit for providing a bi-directional radio communication with at least one other radio device of the system,
  which radio device is independently configured to:
  obtain, by the data transfer circuit, timing information representing timing schedules of one or more other radio devices within its neighborhood;
  define, by the processing circuit, based on the obtained timing information, at least one timing schedule group into which the plurality of radio devices are divided and a size of each at least one timing schedule group by counting a number of radio devices belonging to each at least one timing schedule group; and
  synchronize, by the processing circuit its own timing schedule with the timing schedule of the timing schedule group with the largest size.

14. A synchronization method for the radio device according to claim 13 within a wireless communication system, the method comprises:
  obtaining, by the data transfer circuit, timing information representing timing schedules of one or more other radio devices within its neighborhood;
  defining, by the processing circuit, based on the obtained timing in-formation, at least one timing schedule group into which the plurality of radio devices are divided and a size of each at least one timing schedule group by counting a number of radio devices belonging to each at least one timing schedule group; and
  synchronizing, by the processing circuit its own timing schedule with the timing schedule of the timing schedule group with the largest size.

15. A tangible non-transitory computer readable medium comprising a computer program that comprises instructions which, when the program is executed by the radio device according to claim 13, cause the radio device to carry out at least the steps of the method according to claim 14.

* * * * *